United States Patent [19]

Park

[11] Patent Number: 5,893,439

[45] Date of Patent: Apr. 13, 1999

[54] PARKING MECHANISM FOR A VEHICLE EQUIPPED WITH AN AUTOMATIC TRANSMISSION

[75] Inventor: Dong Hoon Park, Kyungki-do, Rep. of Korea

[73] Assignee: Hyundai Motor Company, Seoul, Rep. of Korea

[21] Appl. No.: 08/855,874

[22] Filed: May 12, 1997

[30] Foreign Application Priority Data

May 15, 1996 [KR] Rep. of Korea ............... 1996-16162

[51] Int. Cl.⁶ .................................................. B60K 41/26

[52] U.S. Cl. .................... 192/4 A; 74/411.5; 188/31

[58] Field of Search .......................... 192/4 A, 219.4; 74/411.5; 188/31, 69

[56] References Cited

U.S. PATENT DOCUMENTS

| | | | |
|---|---|---|---|
| 1,691,907 | 11/1928 | Mikesh | 192/4 A |
| 1,880,066 | 9/1932 | Barnes | 192/4 A |
| 1,966,308 | 7/1934 | Otis | 192/4 A |
| 2,875,856 | 3/1959 | Mrlik et al. | 192/4 A |
| 3,386,532 | 6/1968 | Moss | 192/4 A |

Primary Examiner—Richard M. Lorence
Attorney, Agent, or Firm—Birch, Stewart, Kolasch & Birch, LLP

[57] ABSTRACT

Disclosed is a parking mechanism comprising a parking stopper which is integrally formed on one end of a parking rod of the parking mechanism, mounted within a parking groove in a transmission case, biased by an elastic member, and operated by the operation of a shift lever; and a parking gear, a plurality of which protrude from a transfer gear for the engagement with the parking stopper when the same is moved through a penetrating hole formed in the transmission case, thereby parking a vehicle.

1 Claim, 3 Drawing Sheets

5,893,439

PARKING MECHANISM FOR A VEHICLE EQUIPPED WITH AN AUTOMATIC TRANSMISSION

BACKGROUND

The present invention relates to a parking mechanism for a vehicle equipped with an automatic transmission, and more particularly, to a parking mechanism for a vehicle equipped with an automatic transmission which securely parks the vehicle and improves a free-layout degree of design of a parking gear.

As shown in FIG. 4, a conventional parking mechanism comprises a detente plate 1 rotated by operation of a shift lever(not shown), a push rod 2 operated by the detent plate 1, a cam 4 moving in a rectilinear direction by the push rod 2, a parking sprag 8 which contacts the cam 4 and is rotatably supported by a parking pawl shaft 6, and an annulus gear 10 that engages the parking sprag 8 to park a vehicle.

When a driver changes the shift lever into P range, the parking rod 2 is moved by the detent plate 1. As result, the cam 4, formed on the parking rod 2, moves in a rectilinear direction by the parking rod 2, and the parking sprag 8 rotatably supported by the parking pawl shaft 6 contacts with the cam 4 and, thus, engages the annulus gear 10, thereby parking the vehicle.

As described above, the conventional parking mechanism requires a large number of parts. Accordingly, manufacturing costs are increased and the free-layout degree of design in reduced.

SUMMARY

The present invention has been made in an effort to solve the above problems and its object is to provide a parking mechanism for a vehicle equipped with an automatic transmission which securely parks the vehicle and improves free-layout degree of design.

To achieve the above object, the present invention provides a parking mechanism for a vehicle equipped with an automatic transmission, comprising:

- a parking stopper, which is integrally formed on one end of a parking rod of the parking mechanism, mounted within a parking groove in a transmission case, biased by an elastic member, and operated by the operation of a shift lever; and
- a parking gear, a plurality of which protrude from a transfer gear to be engaged with the parking stopper when the same is moved through a penetrating hole formed in the transmission case, thereby parking a vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
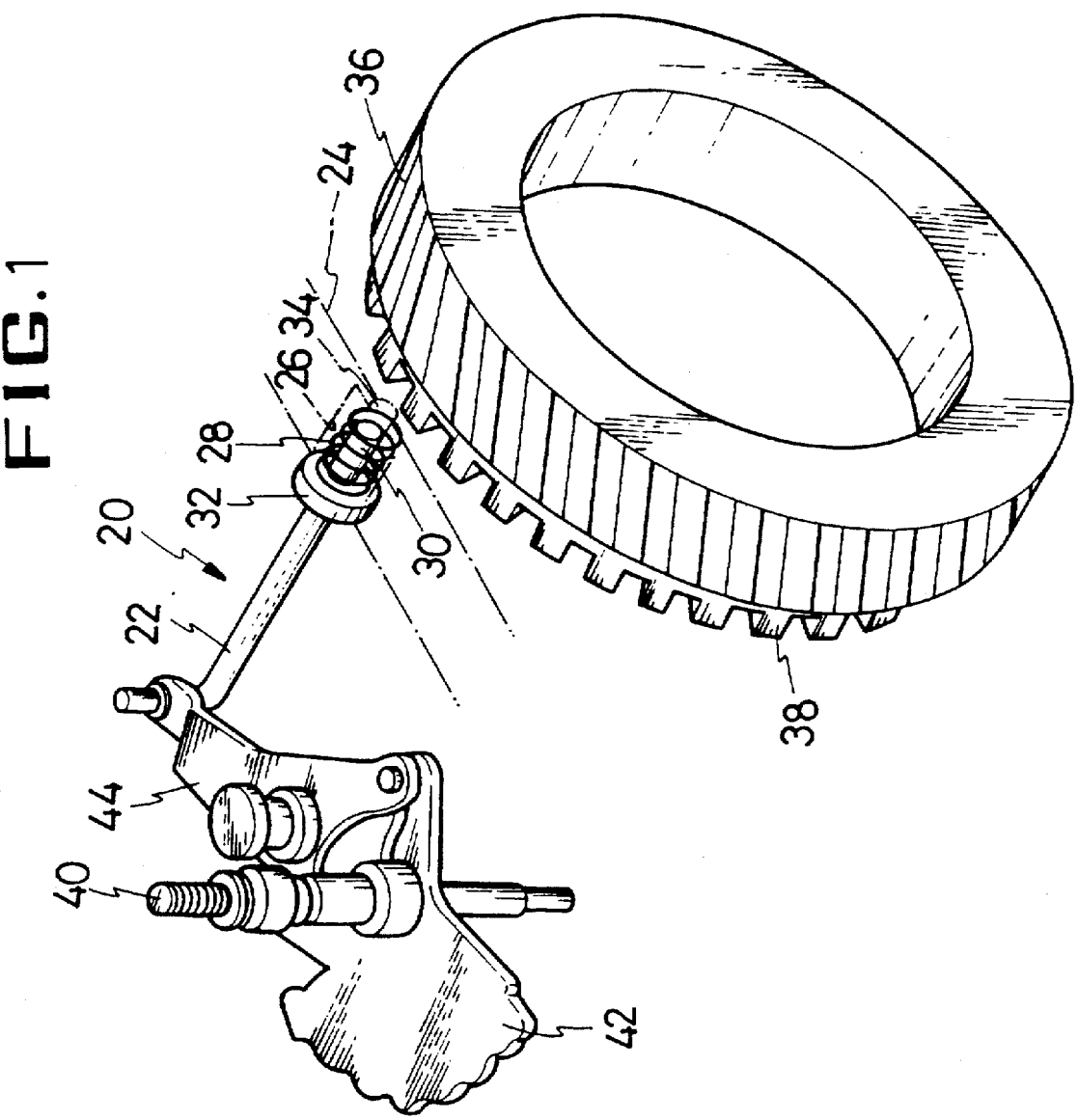
FIG. 1 is a schematic perspective view of a parking mechanism for a vehicle equipped with an automatic transmission according to a preferred embodiment of the present invention.
Figure 2:
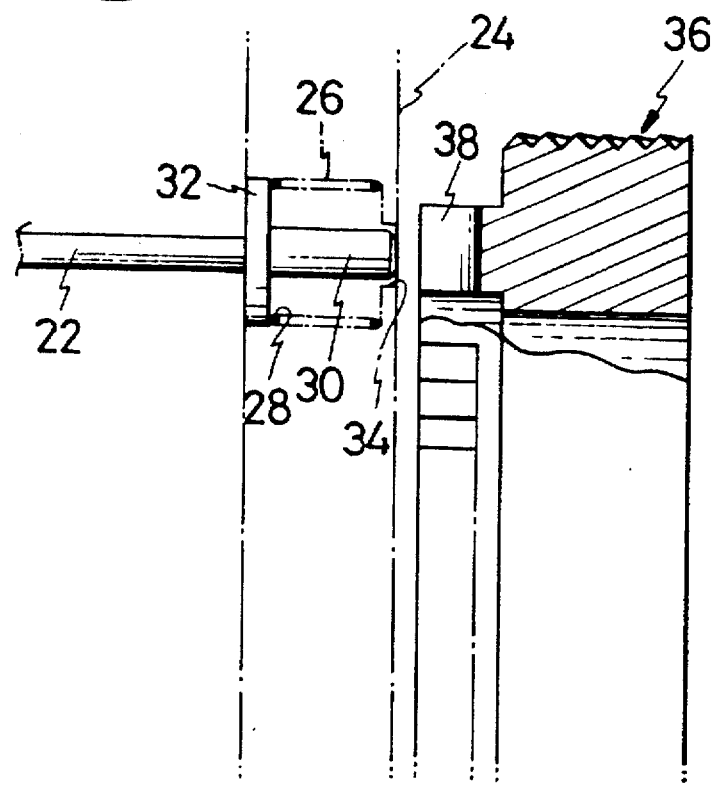
FIG. 2 is a side sectional view of the parking mechanism shown in FIG. 1.

FIG. 1 is a schematic perspective view of a parking mechanism for a vehicle equipped with an automatic transmission according to a preferred embodiment of the present invention, wherein reference numeral 20 indicates a parking mechanism, and FIG. 2 is a side sectional view of the inventive parking mechanism.

The inventive parking mechanism 20 does not use a cam formed on a parking rod, a parking pawl shaft, a parking sprag, or an annulus gear as in the conventional parking mechanism.

Instead, as shown in the drawings, the inventive parking mechanism 20 comprises a parking stopper 30 which is integrally formed on one end of a parking rod 22 of the parking mechanism. The parking stopper 30 is mounted within a parking groove 26 of a transmission case 24 and biased by an elastic member 28.

The parking stopper 30 of the parking mechanism 20 is provided with a flange 32 which contacts and is biased by the elastic member 28 disposed within the parking groove 26. Further, the parking stopper 30 is designed to pass through a penetrating hole 34 formed in the parking groove 26 when the parking rod 22 is moved in a direction against the bias of the elastic member 28. When the parking stopper 30 passes through the penetrating hole 34, it engages a parking gear having teeth 38, a plurality of which protrude from one side of a transfer gear 36. This engagement of the parking stopper 30 with a transfer gear 36 parks the vehicle.

Figure 3:
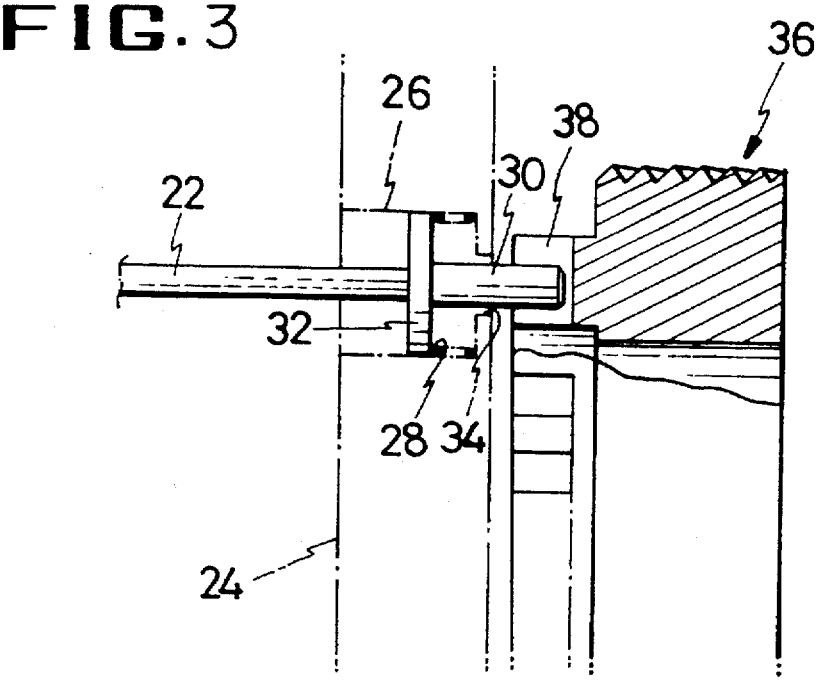
FIG. 3 is a side sectional view used for explaining the operation of the parking mechanism shown in FIG. 1.
Figure 4:
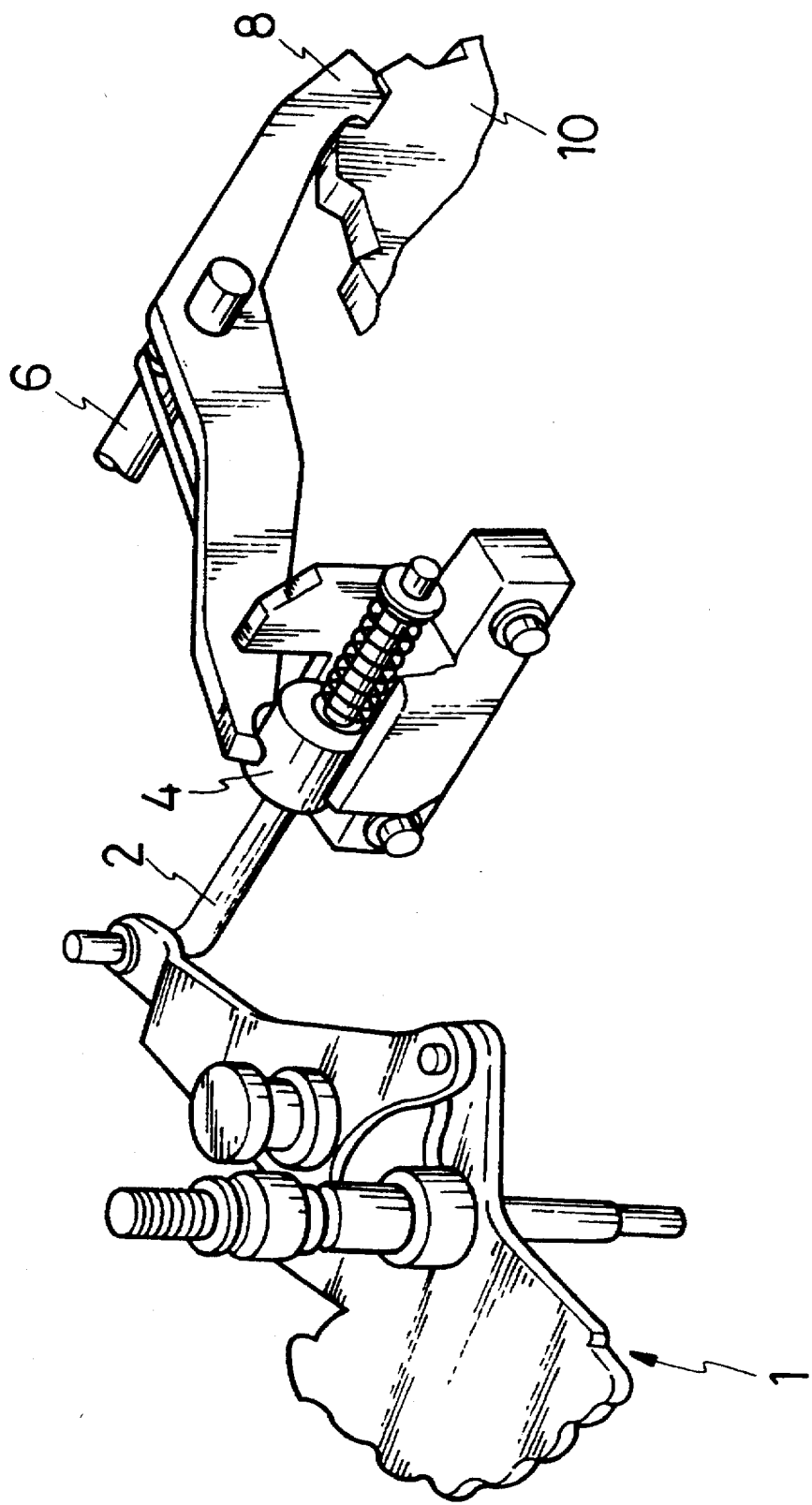
FIG. 4 is a perspective view of a conventional parking mechanism.

The operation of the inventive parking mechanism will now be described with reference to FIG. 3.

When a driver moves a shift lever (not shown) into a parking position, the force of a manual shaft 40 rotates a detent plate 42 (see FIG. 1). The rotation of the detent plate 42 rotates the parking assist lever 44 to move the parking rod 22 toward the transfer gear 36.

Accordingly, the parking stopper 30 formed on the parking rod 22 passes through the penetrating hole 34 against the biasing force of the elastic member 28 disposed within the parking groove 26 of the transmission case 24.

The parking stopper 30 then engages with a parking gear 38 protruded from one side of the transfer gear 36, thereby parking the vehicle.

Using the inventive parking mechanism for vehicles equipped with automatic transmissions allows for the reduction weight of the vehicle by omitting several of the parts used in the conventional parking mechanism. This, in turn, acts to reduce fuel consumption and manufacturing costs. In addition, omitting several parts improves the free-layout degree of design to make it easy to develop new products.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A parking mechanism for a vehicle equipped with an automatic transmission, comprising:

a parking rod cooperating with a shift lever, said parking rod having an axis and linearly moving along the axis;

a parking stopper integrally formed on one end of the parking rod and disposed within a parking groove of a transmission case, said parking stopper having the same axis as that of said parking rod and linearly moving along the axis;

a flange formed between said parking rod and said parking stopper;

a parking gear formed on a transfer gear for engagement with said parking stopper when said parking stopper linearly moves toward said parking gear along the axis by an operation of the shift lever; and an elastic member biasing the flange in a direction where the parking stopper is released from the engagement with said parking gear when the shift lever is released from a parking position.

* * * * *